United States Patent Office 3,560,439
Patented Feb. 2, 1971

3,560,439
SATURATED COPOLYESTER RESINS CONTAINING A MINOR AMOUNT OF STRUCTURAL UNITS DERIVED FROM 2 - HYDROXY - 5 - METHOXY ISOPHTHALIC ACID
John A. Price, Swarthmore, and Mary J. Stewart, Media, Pa., assignors to FMC Corporation, Philadelphia, Pa.
No Drawing. Filed Aug. 9, 1968, Ser. No. 751,373
Int. Cl. C08g 17/08
U.S. Cl. 260—47                                        6 Claims

ABSTRACT OF THE DISCLOSURE

A highly polymeric linear copolyester made by the melt polymerization of reactants comprising: (a) an aromatic dicarboxylic acid or a lower alkyl di-ester thereof, (b) a diol, and (c) 2-hydroxy-5-methoxy isophthalic acid or a lower alkyl diester thereof.

---

This invention relates to highly polymeric linear copolyester resins that possess improved thermal stability and optical brightness and to a method of preparing same.

The highly polymeric linear copolyester resins of the present invention are known as saturated linear copolyesters and can be used for fiber- and film-forming purposes. Saturated linear copolyester resins can be prepared by first carrying out a condensation reaction between aromatic dicarboxylic components or esters thereof, which do not contain any ethylenic unsaturation, and one or more suitable diols to form a prepolymer. The resulting prepolymer is then polycondensed to form the desired copolyester resin. When esters of dicarboxylic acids are used as a starting material, they are first reacted with a diol component in the presence of a transesterification or ester-interchange catalyst by means of an ester-interchange reaction; whereas, when dicarboxylic acids are used as a starting material, they are first subjected to a direct esterification reaction with a diol component in the presence of what is generally called a first stage additive or ether inhibitor. In either instance the resulting product which may be generally described as a copolyester prepolymer is then polycondensed in the presence of a polycondensation catalyst to form a copolyester resin.

From a commercial standpoint, it is essential that copolyester resins suitable for melt spinning into shaped articles such as filaments should have a carboxyl content value of about or below 50 equivalents per million grams (eq./ $10^6$ gr. or meq./kg.), a birefringent melting point at about at least 258 to 260° C. and an intrinsic viscosity preferably not less than 0.60 (determined in a 60% phenol and 40% tetrachloroethane solution, wt./wt., at 30° C.) in order for the shaped articles formed therefrom to possess a relatively high level of hydrolytic stability, thermal stability, and a high degree of tenacity. It is also essential for most uses that such polyester copolymers should exhibit substantially no color.

In view of the many and varied uses to which polyester resins are put today, it is known that for some specific purposes, simple polyester resins such as polyethylene terephthalate and many copolyester resins must be modified in various ways so as to meet the demands of specific end uses. For instance, quite often polyester and copolyester resins produced by the above-defined procedures will exhibit a yellow tinge or off-white color which would make the resin unsatisfactory for use in the manufacture of films and filaments. Additionally, such resins may not possess a degree of thermal stability that is sufficiently high for the end use of such a resin the preparation of products such as textiles which are subjected to rather extreme temperature conditions in the processes of washing, drying, and ironing. Therefore, it is necessary that polyester and copolyester resin compositions possess as much stability at high temperatures as possible.

It is known that it is often desirable to optically brighten polyester resin products by means of a brightening or whitening agent which will impart a generally blue fluorescence to the resin product under the ultra-violet components of daylight. This optical brightening action is the result of an ability of the brightener to convert the ultra-violet light components of daylight to visible blue components which compliment the undesired yellow tinge or off-color of the resin products.

Therefore, it is an object of the present invention to prepare highly polymeric linear copolyester resin compositions which exhibit both improved thermal stability and optical brightness. These and other objects are accomplished in accordance with the present invention with highly polymeric linear copolyester formed from reactants comprised of (a) an aromatic discarboxylic acid or diester thereof, which does not contain any ethylenic unsaturation, (b) a diol, and (c) 2-hydroxy-5-methoxy isophthalic acid or a lower alkyl di-ester thereof.

It will be obvious to those skilled in the present art that when preparing the subject copolyesters by the direct esterification method that 2-hydroxy-5-methoxy isophthalic acid is used; whereas when the subject copolyesters are prepared by the ester-interchange reaction a corresponding lower alkyl diester of said acid is used.

The 2-hydroxy-5-methoxy isophthalic acid or its lower alkyl esters used as monomeric reactants in the present invention can be represented by the following general formula:

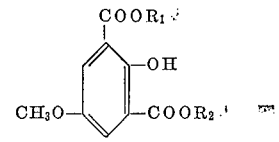

wherein $R_1$ and $R_2$ are both hydrogen or $R_1$ and $R_2$ are both lower alkyl radicals having from 1 to 6 carbon atoms. Any of the compounds coming within the above general formula can be used as the combination optical brightener and thermal stabilizer component or reactant according to the present invention. However, some of the present compounds that have been found to be preferable for this purpose are for example, dimethyl-2-hydroxy-5-methoxy isophthalate, diethyl - 2 - hydroxy-5-methoxy isophthalate, 2-hydroxy-5-methoxy isophthalic acid, and dibutyl-2-hydroxy-5-methoxy isophthalate.

The present combination optical brightener and thermal stabilizer reactant when copolymerized with other suitable polyester or copolyester monomeric reactants, to form a new and improved thermoplastic copolyester, is randomly chemically bonded in the molecular chain as a recurring unit having the general formula

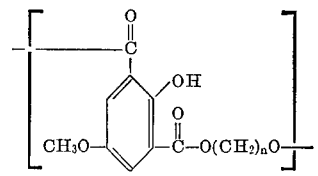

wherein $n$ is a whole number of from 2 to 10, depending on the number of carbon atoms in the alkylene glycol used as the diol reactant.

Specifically, any saturated linear polyesters or copolyester product can be up-graded with regard to thermal stability and optical brightness by incorporating in the polymer chain a minor amount of the above-denoted unit derived from an alkylene glycol and 2-hydroxy-5-methoxy isophthalic acid or a lower alkyl diester thereof.

The present combination optical brightening and thermal stabilizing component may be incorporated into the molecular chain of any of the well-known linear polyester and copolyester compositions by merely copolymerizing same with the initial polyester reactants or prepolymers. In general, 2-hydroxy-5-methoxy isopthalic acid or its lower alkyl esters can be copolymerized with any of the well-known dicarboxylic acids or esters which do not contain any ethylenic unsaturation that are commonly used to prepare polyester resins. For example, among those which have been used and which can be used in combination with the present optical brightener and thermal stabilizer reactant are terephthalic acid, isophthalic acid, p,p'-sulfonyl dibenzoic acid, 1,4-napthalene dicarboxylic acid, 1,6-napthalene dicarboxylic acid and 4,4'-diphenyl dicarboxylic acid.

Among the diols that can be used in the preparation of the subject copolyester resins are any of those represented by the general formula $HO(CH_2)_n OH$ wherein $n$ is from 2 to 10. For example, among the diols that can be used are ethylene glycol, butylene glycol, hexamethylene glycol and decamethylene glycol.

The combination optical brightening and thermal stabilizing monomeric reactants of the present invention can be incorporated into the polyester reaction mixture at any time during its preparation. For instance, the present 2-hydroxy-5-methoxy isophthalic acid or its diesters can be incorporated in the reaction mixture before the esterification or transesterification reaction is begun or at any point thereafter such as at the beginning of the polycondensation stage. Specifically, it has been found that the present combination optical brightening and thermal stabilizing monomeric component will bring about the desired brightening and stabilizing effect when used in amounts ranging from about 0.01 mole percent to 5.0 mole percent, based on the moles of the dicarboxylic acid or ester of the dicarboxylic acid used in the original reaction mixture. In most instances, it has been found that it is preferred to use amounts ranging from about 0.02 mole percent to about 2.5 mole percent. Obviously, larger or smaller amounts can be used. However, it has been found that when concentrations greater than 5.0 mole percent, based on the moles of the dicarboxylic acid or its diester is used, no additional advantage is achieved, whereas, when concentrations less than 0.01 mole percent are used, its effectiveness is somewhat diminished.

The preparation of polyesters and copolyesters via the ester-interchange is generally carried out with a molar ratio of diol to dicarboxylic acid diester of from about 1:1 to about 15:1 respectively, but preferably from about 1.2:1 to about 2.6:1. The transesterification reaction is generally carried out at atmospheric pressure in an inert atmosphere such as nitrogen at a temperature range of 125° C. to about 250° C. but preferably from about 150° C. to 250° C. in the presence of a transesterification catalyst. During the first stage of this reaction, the respective alkanol is evolved and continuously removed by distillation. After a reaction period of from about 1 to 2 hours the temperature of the reaction mixture is raised from 200° C. to 300° C. for approximately 1 to 3 hours in order to complete the transesterification reaction to form the desired polyester prepolymer and distill off any excess diol which may be present.

Any suitable transesterification or ester-interchange catalyst, for example, lithium hydride, lithium amide or zinc acetate can be used to catalyze the present transesterification reaction. Generally, the transesterification catalysts are used at a concentration ranging from about 0.01% to about 0.20% based on the weight of the dicarboxylic acid diester used in the initial reaction mixture.

Similarly, the preparation of polyesters and copolyesters via the direct esterification method is generally carried out with a molar ratio of diol to dicarboxylic acid ranging from 1:1 to about 15:1 but preferably 1.5:1 to about 2.6:1. The direct esterification step is carried out at a temperature ranging from about 180° C. to about 280° C. in the absence of an oxygen containing atmosphere at atmospheric or elevated pressure from about 2 to 4 hours in order to form the desired polyester prepolymer and distill off any excess diol. For example, the reaction may be carried out in an atmosphere of nitrogen.

Any known first stage additive or ether inhibitor may be used in the direct esterification step of the present method. For example, calcium acetate or triethylamine can be used. The first stage additives are generally used in concentrations ranging from $5 \times 10^{-5}$ mole to about $5 \times 10^{-2}$ mole of catalytic additive per mole of dicarboxylic acid present in the initial dicarboxylic acid-diol mixture.

The polycondensation step used in the preparation of the present copolyester resins is accomplished by adding a polycondensation catalyst, such as antimony trioxide, lead acetate or antimony oxalate, to a copolyester prepolymer and heating the blend thereof under reduced pressure within the range of about 0.05 mm. to 20 mm. of mercury while being agitated under a temperature of 260° C. to about 325° C. for from 2 to 4 hours. The polycondensation catalysts are generally employed in amounts ranging from about 0.01% to about 0.2% based on the weight of the prepolymer to be polycondensed. Usually, it has been found that from 0.02% to 0.1% of the polycondensation catalysts are preferred in most instances.

The relative effectiveness of compounds as thermal stabilizers in polyester compositions can be most accurately expressed on the basis of percent broken bonds resulting from exposing a given resin composition containing such a stabilizer to elevated temperatures for a given period, rather than from a direct reading of the difference between the original or initial intrinsic viscosity and the final or degraded intrinsic viscosity of such a resin composition. It is known and logically expected that polyester polymers having higher original intrinsic viscosities will generally show a greater drop in intrinsic viscosty when exposed to elevated temperatures than those with lower original intrinsic viscosities although on a percent broken bonds basis, the stability of such a resin composition having a high original intrinsic viscosity might be equivalent to one exhibiting a lesser drop in intrinsic viscosity.

The percent broken bonds value, as determined for polyethylene terephthalate, is defined as the bonds broken per mole of ethylene terephthalate times 100, and the values given hereinbelow in the following examples were calculated by the use of the following equation:

Percent broken bonds $$= \left[ \left(\frac{K}{V_f}\right)^{1/a} - \left(\frac{K}{V_i}\right)^{1/a} \right] \times 9.6 \times 10^3$$

The value of $K$ and $a$ may be found in the literature, such as Conix, A., Makromol., Chemie 26, p. 226 (1958), wherein $K = 0.00021$ and $a = 0.82$. $V_f$ in the above formula is the degraded or final intrinsic viscosity value and $V_i$ is the original or initial intrinsic viscosity value.

For purposes of obtaining original or initial intrinsic viscosity values for insertion in the above equation, the original intrinsic viscosity values of the polyester resin products were obtained by measuring the intrinsic viscosities of the resin compositions as produced. The degraded intrinsic viscosity values for insertion in the above equation were determined by the following procedure: The polyester resin composition was ground and passed through a 10 U.S.S. mesh screen and dried at 120° C. in vacuo for 16 hours, then cooled in a desiccator. Two to three grams of this dried resin was then placed in a test tube which was then inserted into an aluminum block preheated to 280° C. (±0.5° C.). The block was then sealed and evacuated to 0.1 mm. of mercury. After holding for about 10–15 seconds, the block was filled with dried, oxygen-free nitrogen gas. This vacuum-nitrogen purge was then repeated for a total of three times; the entire process took 5–7 minutes. Then, the resin sample was left in the heated block for an additional two hours under a slow stream of nitrogen. After this two hour period, the resin sample was removed from the block and placed in a desiccator which was first evacuated and then filled with nitrogen. The intrinsic viscosity of the resin product was then determined and such an intrinsic viscosity value is noted as the degraded intrinsic viscosity.

All of the intrinsic viscosity determinations of the polyester resin products produced in the examples below were determined in a 60% phenol—40% tetrachloroethane solution, wt./wt., at 30° C., according to conventional laboratory procedure.

The following examples of several preferred embodiments of the subject invention will further serve to illustrate the present invention.

EXAMPLE I

A mixture comprising 600 g. of dimethyl terephthalate, 396 mls. of ethylene glycol, and 0.24 g. of lithium amide was charged into a reaction vessel equipped with a nitrogen inlet, heating means and stirring means. The reaction mixture was agitated and heated at atmospheric pressure to about 195° C. under a nitrogen blanket. The reaction mixture was held at about 195° C. for about two hours, during which time by-product methyl alcohol was distilled off. Then, the temperature was allowed to rise to about 230° C. over a pediod of about one hour to distill off any remaining by-product methyl alcohol and a small portion of the excess glycol and form a polyester prepolymer. The prepolymer product was allowed to cool under an atmosphere of nitrogen.

EXAMPLE II

Fifty grams of the prepolymer product of Example I was mixed with 0.02 g. of antimony oxalate and placed in a reaction vessel. The reaction mixture was heated at about 280° C. under a residual nitrogen reduced atmosphere of from about 0.05 to about 0.1 mm. of mercury while under agitation for about two hours to bring about the polycondensation of the prepolymer and formation of a polyester resin. The polyethylene terephthalate resin formed had an original intrinsic viscosity of 0.81, a carboxyl content value of 10 meq./kg., a melting point of about 264° C., and a degraded intrinsic viscosity of 0.64. The percent broken bonds per the above-identified testing procedure and equation was calculated as 0.138. The resin product did not exhibit any fluorescence in ultraviolet light.

EXAMPLE III

Fifty grams of the prepolymer product of Example I was mixed with 0.02 g. of antimony oxalate and placed in a reaction vessel. The reaction mixture was heated at about 280° C. under a residual nitrogen reduced atmosphere of from about 0.05 to about 0.1 mm. of mercury while under agitation for about two hours to bring about the polycondensation of the prepolymer. While the resulting resin was still molten, 0.02 ml. of triphenyl phosphite, (0.05% based on the grams of dimethyl terephthalate used in the preparation of prepolymer) was thoroughly stirred into the molten resin. The resulting polyester resin had an original intrinsic viscosity of 0.69, a carboxyl content value of 20 meq./kg., a melting point of 263° C. and a degraded intrinsic viscosity of 0.61. The percentage broken bonds per the above-identified testing procedure was calculated as 0.079. The polyester resin did not exhibit any fluorescence in ultraviolet light.

EXAMPLE IV

Six hundred grams of dimethyl terephthalate, 396 mls. of ethylene glycol, 0.24 gram of lithium amide and 0.74 gram of dimethyl-2-hydroxy-5-methoxy isophthalate (0.1 mole percent based on the moles of dimethyl terephthalate) was charged into a reaction vessel equipped with a nitrogen inlet, heating means and stirring means. The reaction mixture was agitated and heated at atmospheric pressure to 195° C. under a nitrogen blanket. The reaction mixture was held at about 195° C. for about two hours, during which time by-product methyl alcohol was distilled off. Then, the temperature was allowed to rise to about 230° C. over a period of about one hour to distill off any remaining by-product methyl alcohol and some excess glycol and form a polyester prepolymer. The prepolymer product was allowed to cool under an atmosphere of nitrogen.

EXAMPLE V

Fifty grams of the prepolymer product of Example IV was mixed with 0.02 gram of antimony oxalte and placed in a reaction vessel. The reaction mixture was heated at about 280° C. under a residual nitrogen reduced atmosphere of from about 0.05 to about 0.1 mm. of mercury while under agitation for about two hours to bring about the polycondensation of the prepolymer and formation of a copolyester resin. The copolyester resin formed had an original intrinsic viscosity of 0.83, a carboxyl content value of 10 meq./kg., a melting point of 264° C. and a degraded intrinsic viscosity of about 0.70. The percentage broken bonds was calculated as 0.089. The resin product exhibited an intense blue fluorescence in ultra-violet light.

EXAMPLE VI

Fifty grams of the prepolymer product of Example I was mixed with 0.02 g. of antimony oxalate and 0.0313 gram of dimethyl -2- hydroxy -5- methoxy isophthalate (0.064 mole percent based on the moles of dimethyl terephthalate used in preparation of prepolymer) and placed in a reaction vessel. The reaction mixture was heated at about 280° C. under a residual nitrogen reduced atmosphere of from about 0.05 to about 0.1 mm. of mercury while under agitation for about two hours to bring about the polycondensation of the prepolymer and the formation of a copolyester resin. The copolyester resin formed had an original intrinsic viscosity of 0.74, a carboxyl content value of 10 meq./kg., a melting point of 266° C., and a degraded intrinsic viscosity of 0.65. The percent broken bonds of this resin per the above-identified testing procedure was calculated at 0.080. The resulting copolyester product exhibited an intense blue fluorescence in ultraviolet light.

EXAMPLE VII

A mixture comprising 600 g. of dimethyl terephthalate, 396 ml. of ethylene glycol, 0.74 g. of dimethyl-2-hydroxy-5-methoxy isophthalate (0.1 mole percent based on the weight of dimethyl terephthalate) 0.3 ml. of triphenyl phosphite and 0.24 g. of lithium amide was charged into a reaction vessel equipped with a nitrogen inlet, heating means, and stirring means. The reaction mixture was agitated and heated at atmospheric pressure to 195° C. under a nitrogen blanket. The reaction mixture was held at about 195° C. for about two hours during which time by-product methyl alcohol was distilled off. Then, the temperature was allowed to rise to about 230° C. over a period of about one hour to distill off any remaining by-product methyl alcohol and some excess glycol and form a polyester prepolymer. The prepolymer product was allowed to cool under an atmosphere of nitrogen.

EXAMPLE VIII

Fifty grams of the prepolymer product of Example VII was mixed with 0.02 g. of antimony oxalate and placed in a reaction vessel. The reaction mixture was heated at about 280° C. under a residual nitrogen reduced atmosphere of from about 0.05 to about 0.1 mm. of mercury while under agitation for about two hours to bring about the polycondensation of the prepolymer and formation of a polyester resin. The resulting polyester product had an original intrinsic viscosity of 0.73, a melting point of 262° C., a carboxyl content value of 9 meq./kg., and a degraded intrinsic viscosity of 0.67. The percent broken bonds per the above-identified testing procedure and equation was calculated as 0.049. The resulting copolyester resin product exhibited an intense blue fluorescence in ultraviolet light.

Various changes and modifications can be made without departing from the spirit and scope of the above-identified invention and therefore the invention is not to be limited except as defined in the appended claims.

We claim:

1. A resinous copolyester of (a) at least one aromatic dicarboxylic acid containing no ethylenic unsaturation, (b) at least one diol of the formula $HO(CH_2)_nOH$ wherein $n$ is from 2 to 10, and (c) a minor amount of 2-hydroxy-5-methoxy isophthalic acid.

2. A copolyester resin of claim 1 wherein (a) is terephthalic acid, and (b) is ethylene glycol.

3. A copolyester of claim 1 wherein (a) is a mixture of p,p'-sulfonyl dibenzoic acid and terephthalic acid, and (b) is ethylene glycol.

4. The copolyester of claim 2 wherein 2-hydroxy-5-methoxy isophthalic acid is present in a concentration from about 0.01 mole percent to about 5 mole percent based on the moles of terephthalic acid.

5. A saturated copolyester resin of an aromatic dicarboxylic acid containing no ethylenic saturation and a diol of the formula $HO(CH_2)_nOH$ containing a minor amount of recurring structural units of the formula,

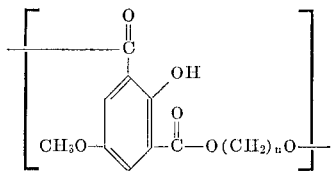

wherein $n$ is a number of from 2 to 10, randomly chemically bonded in the molecular chain of said polyester.

6. A copolyester of claim 1 wherein (a) is a combination of terephthalic acid and isophthalic acid and (b) is ethylene glycol.

References Cited

UNITED STATES PATENTS

| | | | |
|---|---|---|---|
| 3,047,536 | 7/1962 | Gordon | 260—47(C) |
| 3,227,680 | 1/1966 | Tamblyn et al. | 260—47(C) |
| 3,344,115 | 9/1967 | Rein | 260—47(C) |

WILLIAM H. SHORT, Primary Examiner

L. P. QUAST, Assistant Examiner

U.S. Cl. X.R.

260—45.85, 75